United States Patent [19]

Kato

[11] Patent Number: 4,805,016
[45] Date of Patent: Feb. 14, 1989

[54] ENDOSCOPIC SYSTEM FOR CONVERTING PRIMARY COLOR IMAGES INTO HUE, SATURATION AND INTENSITY IMAGES

[75] Inventor: Haruo Kato, Kuroiso, Japan

[73] Assignee: Kabushiki Kaisha Toshiba, Kawasaki, Japan

[21] Appl. No.: 87,787

[22] Filed: Aug. 21, 1987

[30] Foreign Application Priority Data

Aug. 25, 1986 [JP] Japan .................................. 61-197293
Apr. 24, 1987 [JP] Japan .................................. 62-100154

[51] Int. Cl.$^4$ ............................................. H04N 7/18
[52] U.S. Cl. ........................................ 358/98; 358/80
[58] Field of Search ...................... 358/98, 80, 78, 22, 358/21 R; 382/51

[56] References Cited

U.S. PATENT DOCUMENTS

| | | | |
|---|---|---|---|
| 4,500,919 | 2/1985 | Schreiber .......................... | 358/80 X |
| 4,623,973 | 11/1986 | Hoffrichter et al. .............. | 358/80 X |
| 4,633,303 | 12/1986 | Nagasaki et al. .................... | 358/98 |
| 4,654,720 | 3/1987 | Tozawa .............................. | 358/80 X |

OTHER PUBLICATIONS

"Digital Image Processing" by K. R. Castleman, Prentice-Hall, 1979; pp. 87–92.
IBM J. Res. Develop., vol. 27, No. 4, Jul. 1983; Edward J. Farrell; pp. 356–366.

Primary Examiner—Howard W. Britton
Assistant Examiner—Victor R. Kostak
Attorney, Agent, or Firm—Foley & Lardner Schwartz, Jeffery, Schwaab, Mack, Blumenthal & Evans

[57] ABSTRACT

An endoscopic system provides a color picture by combining three primary color images with each other. The endoscopic system comprises an image converting device for performing a process of converting the respective primary color images into hue, saturation, and intensity images, and a process of reproducing three primary color images from the converted hue, saturation, and intensity images; and a histogram processing device for performing a process of obtaining a histogram based on at least one of the hue, saturation, and intensity images obtained by the image converting device, and executing at least one of a process of stretching the histogram and a process of shifting the histogram.

10 Claims, 8 Drawing Sheets

FIG.3A    FIG.3B
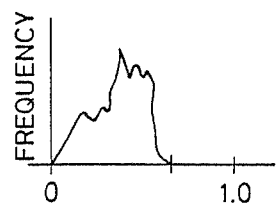 ⇒ 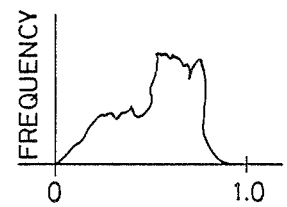
FIG.4A    FIG.4B
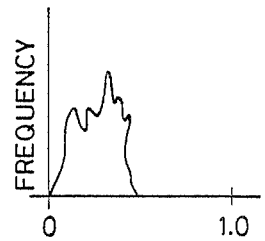 ⇒ 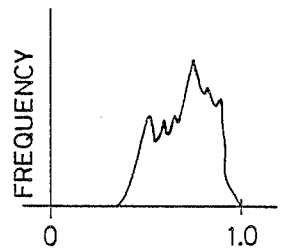

ENDOSCOPIC SYSTEM FOR CONVERTING PRIMARY COLOR IMAGES INTO HUE, SATURATION AND INTENSITY IMAGES

BACKGROUND OF THE INVENTION

1. Field of the Invention

The present invention relates to an endoscopic system which provides a color picture by combining, for instance, the three primary color images, i.e., a red (R) image, a green (G) image, and a blue (B) image, and particularly to an improvement of a mechanism for adjusting the color and contrast of a color picture.

2. Description of the Prior Art

Endoscopic systems usually use a plane sequential method in which the color of an illuminating light is sequentially changed among R, G, and B colors, or a point sequential method in which an image is photographed with the three primary colors at the same time, or a simultaneous method.

In such prior art endoscopic systems, the color and contrast of a color picture are adjusted by stretching histograms of, for instance, R image, G image, and B image of the color picture. According to such a stretching adjustment, the contrast of the picture is enhanced but the color thereof which is an important factor in the color picture, tends to differ from the actual color.

As described in the above, according to the prior art, the histograms of the R, G, and B images are subjected to the stretching adjustment to enhance the contrast of the color picture, but it is difficult to always maintain the actual color of the picture.

Therefore, when the stomach of a patient is monitored by a prior art endoscopic system to see whether or not a cancer exists, it is frequently difficult to distinguish a delicate color difference between the cancer and a normal part. In addition, the prior art endoscopic systems are not provided with functions and mechanisms for executing a histogram equalization process of a hue image and a saturation image.

SUMMARY OF THE INVENTION

In view of the above problems, an object of the present invention is to provide an endoscopic system which can correctly and quickly enhance the color and contrast of a color picture.

In order to accomplish the object mentioned in the above, the present invention provides an endoscopic system comprising an image converting portion for converting the three primary color images into a hue image, a saturation image, and an intensity image, and for reproducing the three primary color images from the converted hue, saturation, and intensity images; and a histogram processing portion for obtaining histograms of the respective hue, saturation, and intensity images prepared by the image converting portion, stretching the histograms of the hue and intensity images, and shifting the histogram of the saturation image.

BRIEF DESCRIPTION OF THE DRAWINGS

The other objects, features and advantages of the present invention will become more apparent from the following descriptions of the preferred embodiments taken in conjunction with the accompanying drawings in which:

FIGS. 3A and B are explanatory views showing a process for obtaining the histogram of an intensity image;

FIGS. 4A and B are explanatory views showing a process for obtaining the histogram of a saturation image;

DETAILED DESCRIPTION OF THE PREFERRED EMBODIMENTS

The preferred embodiments of the present invention will now be described with reference to the drawings.

A color picture provided by an endoscopic system according to the present invention comprises, for instance, the three primary colors of red (R), green (G), and blue (B).

Figure 1:
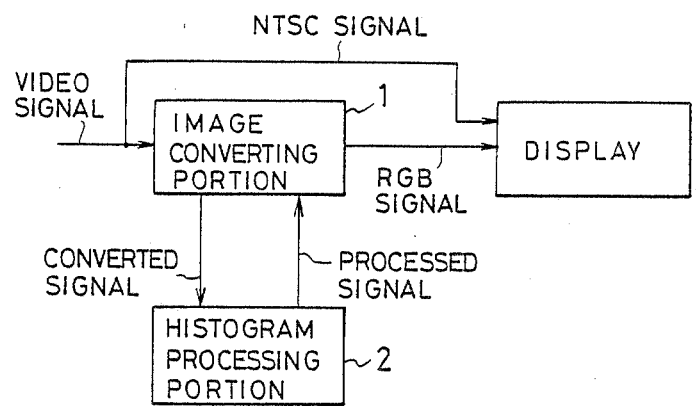
FIG. 1 is a functional block diagram showing a schematic constitution of the present invention.

To adjust the color and contrast of the color picture, the present invention uses an arrangement with a functional block shown in FIG. 1. In this figure, an image converting portion 1 converts a color picture comprising, for instance, the primary color images, i.e., R, G, and B images into color spaces of hue, saturation, and intensity images which are more comprehensible to human eyes.

Figures 2A, 2B:
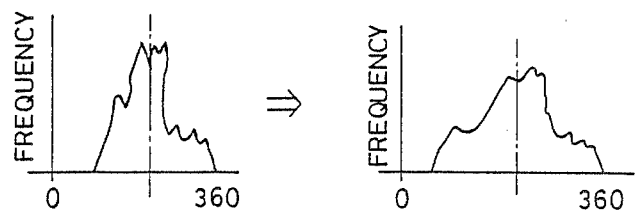
FIGS. 2A and B are explanatory views showing a process for obtaining the histogram of a hue image.

After the conversion, a histogram processing portion 2 executes a histogram preparing process for the respective hue, saturation, and intensity images to obtain histograms of the hue, intensity, and saturation images, as typically shown in FIGS. 2A, 3A, and 4A respectively.

For the hue image, the histogram processing portion 2 carries out the so-called histogram stretching process to stretch the range (from 0° to 360°) of color change such that a state shown in FIG. 2B is obtained from a state shown in FIG. 2A. At this time, to prevent the color of the whole picture plane on a display from changing, the histogram is stretched around the most frequently appearing hue value of the original picture.

The histogram of the intensity image is stretched from a state shown in FIG. 3A to a state shown in FIG. 3B. Depending on the kind of the conversion, for instance if an HSI conversion is used, and if the intensity is excessively strong, the color of the picture is whitish when the original picture with R, G, and B colors is reproduced based on the stretched data. Therefore, it is preferable not to stretch the intensity image up to its maximum extent. However, by stretching the intensity image, an effect corresponding to a contrast enhancing effect in a black-and-white picture can be obtained.

The histogram of the saturation image is shifted to its higher side to obtain a state shown in FIG. 4B from a state shown in FIG. 4A.

After performing proper processes in the histogram processing portion 2 as mentioned in the above, the image converting portion 1 reproduces color images from the hue, saturation, and intensity images. Then, a picture which has been enhanced in color and contrast as required is displayed on a display.

The hue, saturation, and intensity images can be displayed as a black-and-white picture on a color display via a black-and-white displaying device included in the image converting portion, or can be displayed as a black-and-white image on a black-and-white display (not shown).

The present invention will be described in more detail according to the embodiments.

Figure 5:
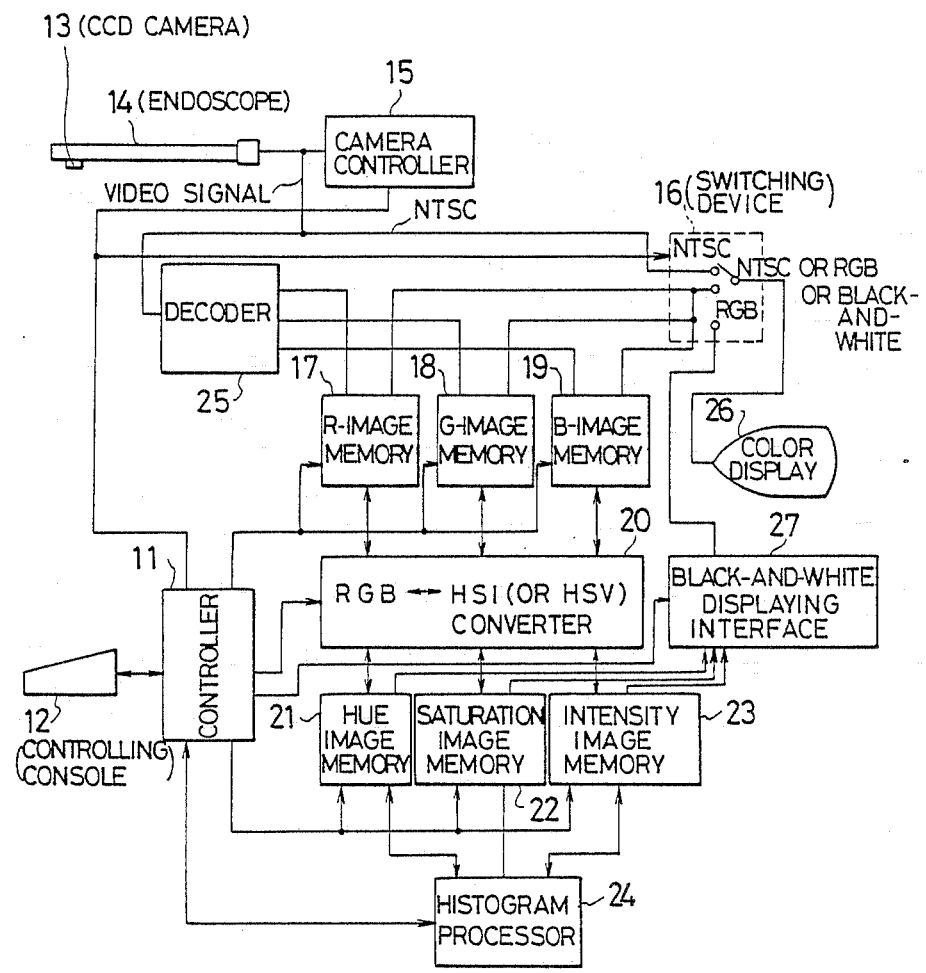
FIG. 5 is a block diagram showing an essential part of a first embodiment according to the present invention.

FIG. 5 is a block diagram showing an essential constitution of an endoscopic system of an embodiment according to the present invention.

In this figure, a numeral 11 represents a controller disposed as a controlling center. Driven in response to instructions from and connected to the controller 11 are a controlling console 12, a camera controller 15 for controlling a CCD camera 13 fitted to an endoscope 14, a switching device 16, a red (R) image memory 17, a green (G) image memory 18, a blue (B) image memory 19, an RGB/(hue-saturation-intensity) converter 20, a hue image memory 21, a saturation image memory 22, an intensity image memory 23, and a histogram processor 24. A numeral 25 represents a decoder, 26 a color display, and 27 a black-and-white display interface.

Video signals provided by the CCD camera 11 are transferred as NTSC signals as they are, to the color display 26. The video signals are also transmitted through the decoder 25 and stored in a frame memory comprising the R, G, and B image memories 17, 18, and 19. A selecting instruction from the controlling console 12 via the controller 11 decides whether the contents of the NTSC signals or the contents of the data stored in the frame memory are displayed.

The image data stored in the R, G, and B image memories 17, 18, and 19 are processed in the converter 20, and converted into hue, saturation, and intensity images which are in turn stored in the hue, saturation, and intensity image memories 21, 22, and 23.

Under this state, if the controlling console 12 is operated, or if a switch (not shown) is pressed to transmit instructions from the controller 11 to the histogram processor 24, the histogram processor 24 is actuated to stretch the histogram of the hue image around an average hue value or around the most frequently appearing hue value (FIGS. 2A and 2B).

The stretching size of the hue image may be determined based on parameters previously obtained by a statistical method, or based on different parameters obtained for respective images.

A stretching process similar to that carried out for the histogram of the hue image is carried out for the histogram of the intensity image (FIGS. 3A and 3B). In this case, not like the one for the hue image, the stretching process need not be especially carried out around the most frequently appearing value but may be used when necessary.

In connection with the saturation image, the same stretching process is carried out, or the histogram thereof as a whole is shifted to its higher value side, while maintaining the shape of the histogram (FIGS. 4A and 4B). It is also possible to obtain a good result by carrying out the same histogram stretching process as that executed for the intensity image.

When the histograms of the hue, saturation, and intensity images are completely processed, the controller 11 actuates the converter 20 which converts the data processed by the histogram processor 24 into R, G, and B images. The converted data are stored in the R, G, and B image memories 17, 18 and 19.

After that, the controller 11 generates instructions to transfer the converted data stored in the R, G, and B image memories 17, 18, and 19 to the color display 26. When the switching device 16 is switched according to the above-mentioned instructions, a picture corresponding to the converted data stored in the R, G, and B image memories 17, 18, and 19 is displayed on the color display 26.

When it is desired to change the whole color picture plane on the color display 26 into the one having a high saturation (namely a picture with vivid colors for the whole plane), it is preferable to provide the histogram processor 24 with a process for changing all of the saturation image data stored in the saturation image memory 21 to have the maximum saturation values. In this case, the hue and intensity images are still subjected to the above-mentioned histogram processing. In connection with the hue, saturation, and intensity images, images before the histogram processing and images after the histogram processing are displayed on the display as black-and-white images according to instructions from the black-and-white display interface and the controller.

As described in the above, according to the endoscopic system of the present invention, a color change can be enhanced by processing the histogram of a hue image, and the brightness can be enhanced by processing the histogram of intensity image. Further, the vividness of the color of the whole picture plane can be increased by processing the histogram of saturation image. By reproducing the three primary color images after the above-mentioned processes, the density resolution of the entire color picture can remarkably be improved.

As a result, a delicate color difference between an diseased part and a normal part of an internal organ can correctly be displayed on a color display. Therefore, the image diagnostic capacity of a physician can be improved.

Since the components of colors are enhanced, an S/N ratio can remarkably be improved.

Figure 6:
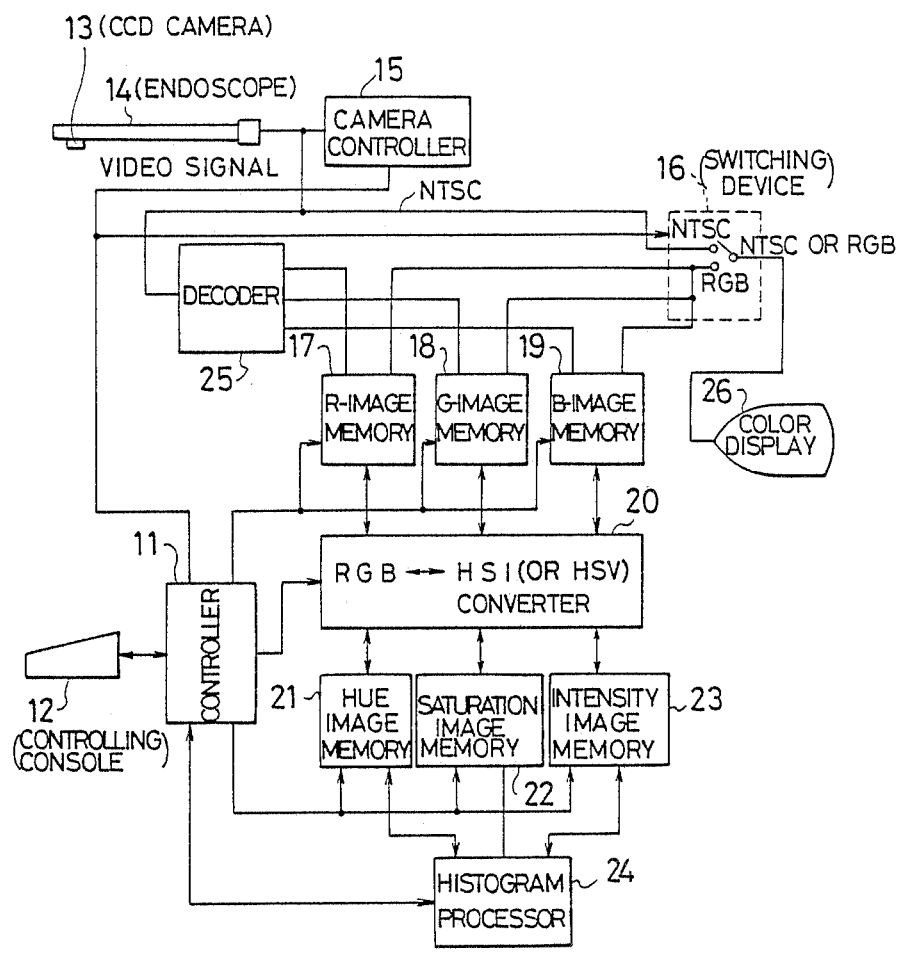
FIG. 6 is a schematic view showing an endoscopic system according to a second embodiment of the present invention.

FIG. 6 is a view showing a second embodiment of the endoscopic system according to the present invention. In this embodiment, a color picture photographed by a CCD camera is, on the one hand, guided as NTSC signals to a display, and, on the other hand, transferred through a decoder 25 to R, G, and B frame memories 17, 18, and 19. According to instructions from a controlling console 12, it is decided which image is displayed on a display 26. Such instructions may be given by an operator through a switch (not shown). The image data stored in the R, G, and B image memories 17, 18, and 19 are processed by an RGB/(hue-saturation-intensity) converter 20 and converted into hue, saturation, and intensity images, which are in turn stored in hue, saturation, and intensity image memories 21, 22, and 23. According to instructions which are generated by the controlling console 12 or by pushing the switch (not shown), a histogram processor 24 is actuated to carry out a histogram equalization process for the histogram of the hue image.

This histogram equalization may be done in the range of 0° to 360°, or the original hue histogram may be converted to have values between $-180°$ and $180°$, thereafter performing the histogram equalization between $-180°$ and $180°$. In this case, after the histogram equalization, the values are returned to values between 0° and 360°. The reason why the values are returned to those between 0° and 360° is because the conversion used is the HSV conversion or the HSI conversion. In another conversion, for instance, of the range from $-60°$ to 300°, the histogram equalization may be done within this range, and is efficient when the input hue band area is relatively narrow.

The entire hue image obtained by the histogram equalization can be turned by a predetermined times according to, or not according to, statistical data or parameters. Such a turn is made for "x" times (x is a real number) with one turn being 0° to 360°, in a manner of turning the dial plate of a clock while fixing the hands thereof, to obtain a required color system for the entire image. When the histogram processing is completed, the controller 11 automatically actuates the converter 20 to convert the hue, saturation, and intensity images into R, G, and B images. After that, the controller 11 sends instructions to display a picture on the display 26 according to the images subjected to the histogram processing.

According to the endoscopic system of this embodiment, R, G, and B color images can be obtained. The images are converted into hue, saturation, and intensity spaces. Thus, only a hue image, only a saturation image, and only an intensity image can be respectively obtained.

Figure 7:
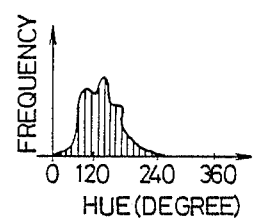
FIG. 7 is a graph showing the relationship between hue and frequency according to an HSI conversion.
Figure 8:
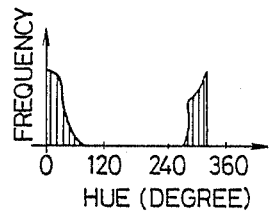
FIG. 8 is a graph showing the relationship between hue and frequency according to an HSV conversion.

As shown in FIG. 7, frequency in hue image is increased around 120° when the HSI conversion is used, and, when the HSV conversion is used, around 0° and 360° as shown in FIG. 8, i.e., around a red color. This is because an image of an internal organ (for instance a stomach wall) of a human body is entirely reddish.

Figure 9:
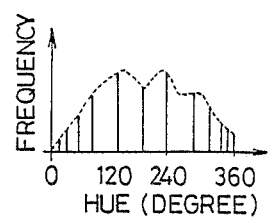
FIGS. 9 and 10 are graphs showing the relationship between hue and frequency after carrying out a histogram equalization process with respect to the histograms shown in FIGS. 7 and 8.
Figure 10:
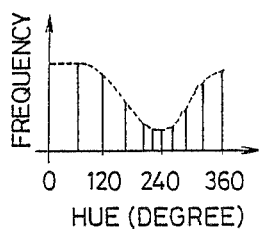

The data of the hue image are subjected to a process corresponding to the histogram equalization process. Namely, the data are converted such that the average frequencies of respective colors are the same entirely. In this case, the data are converted into values between 0° and 360°. Thus, the histograms shown in FIGS. 7 and 8 are changed to those shown in FIGS. 9 and 10.

The data of the hue image subjected to the above-mentioned process and the data of the original saturation and intensity images are reconverted into R, G, and B images. Then, the reddish image is changed to an image having various colors. Namely, delicate differences in color are changed to large changes of color so that a diseased portion such as a cancer can easily be detected.

In this embodiment, the operational sequences are as follows:

(1) observing a picture, (2) displaying the picture of an object (such as a cancer) on a display, (3) pushing a freeze button (not shown), (4) storing the picture as R, G, and B images in R, G, and B memories, (5) inputting histogram process instructions from a console, (6) converting the R, G, and B images into hue, saturation, and intensity images and storing them in the respective memories, (7) carrying out a histogram processing, (8) taking the data of the hue, saturation, and intensity images out of the respective memories, converting them into R, G, and B images, and storing them in the respective memories, and (9) displaying a picture based on the stored R, G, and B images on the color display.

Therefore, a delicate color difference between the cancer and the normal part is enhanced by the histogram equalization process of the hue image, and the resolution of the color image as a whole can be improved. Since the color difference between the cancer portion and the normal part is enhanced, the image diagnostic capacity of a physician can be improved.

A third embodiment of the present invention will be described. In FIG. 6, according to instructions generated by the controlling console 12 or by pushing the switch (not shown), the histogram processor 24 is operated to perform the histogram equalization process for saturation image.

Figure 11:
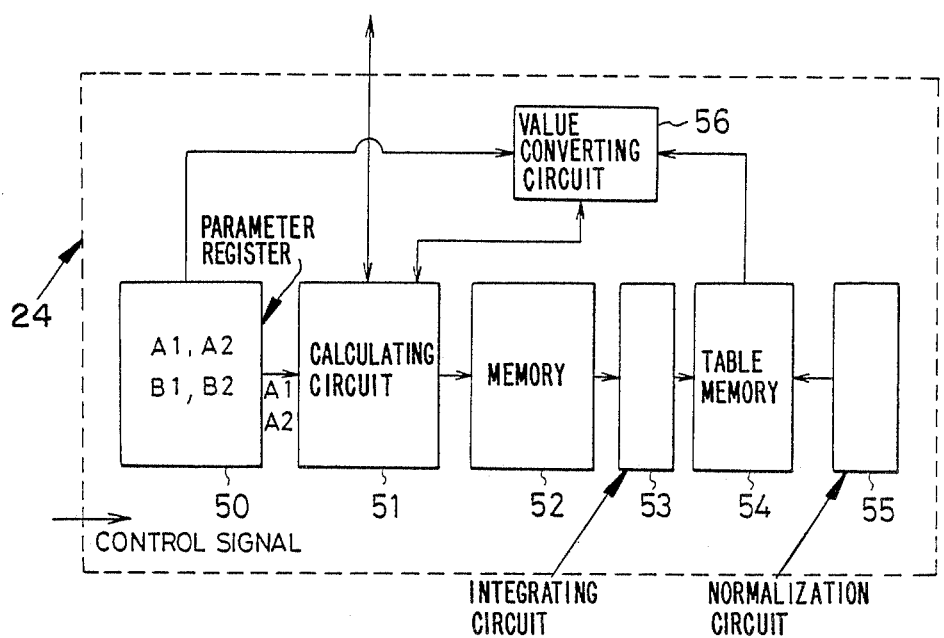
FIG. 11 is a block diagram showing a processor for the histogram equalization.
Figure 12A:
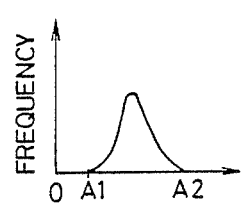
FIG. 12A is a graph showing a histogram stored in a histogram memory shown in FIG. 11.
Figure 12B:
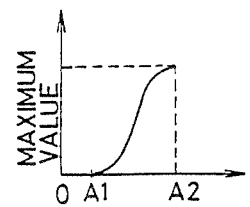
FIGS. 12B and 12C are graphs showing histograms stored in an integrated histogram table memory shown in FIG. 11 before and after a normalization.

FIG. 11 is a block diagram showing the histogram processor 24 according to the third embodiment of the present invention in which the histogram equalization process is carried out for the saturation image. The histogram of the saturation image stored in the saturation image memory 22 shown in FIG. 6 is calculated by a histogram calculating circuit 51. The results of the calculation are stored in a histogram memory 52. At this time, the range (from A1 to A2) of the histogram calculation is supplied from a parameter register 50. An example of the histogram is shown in FIG. 12A for clearly understanding the calculation. An integrating circuit 53 sequentially integrates the histogram, and the results are written into an integrated histogram table memory 54. At this time, the memory 54 stores values such as those shown in FIG. 12B derived by integrating the values shown in FIG. 12A. Then, a normalization circuit 55 rewrites the values in the integrated histogram table memory 54 such that the maximum value in FIG. 12B is set to "1". At this moment, the integrated histogram table memory 54 has values shown in FIG. 12C.

A value converting circuit 56, with reference to the integrated histogram table memory 54, converts the values in the integrated histogram table memory 54 into values of the range (from B1 to B2) stored in the parameter register 50, i.e., into values ranging from 0 to 1. Namely, the histogram equalization is carried out for the respective data stored in the saturation image memory by referring to the data in the integrated histogram table memory 54. If the values are in the range of A1 to A2, the histogram equalization is carried out in the range of B1 to B2. The values A1, A2, B1, and B2 may be predetermined or obtained by statistical calculation of the original images. FIG. 12 shows an example of the conversion carried out by the value converting circuit 56.

When the histogram processing is completed, the controller 11 automatically activates the RGB/HSV converter 20 to convert the respective data into R, G, and B images. After that, instructions are given from the controller 11 to the color display 26 to display a picture as a whole based on the images subjected to the histogram processing.

Figure 12C:
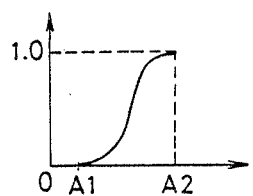
Figure 12D:
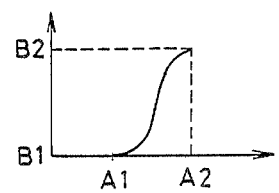
FIG. 12D is a graph showing the contents of a reference table converted from FIG. 12C in order to perform a converting process by a value converting circuit shown in FIG. 11.

According to the normalization of the histogram, as shown in FIG. 12C, average pixel numbers for the respective saturation values are constant, and the difference in saturation between the cancer portion and the normal portion is enhanced. For parameters A1, A2, B1, and B2, the preferable results are generally obtained with A1=0, A2=1, B1=0, and B2=1.

The endoscopic system according to the third embodiment of the present invention provides R, G, and B color images. The color images are converted into hue, saturation, and intensity spaces. At this time, the HSV conversion, for instance, is used. As a result, only a hue image, only a saturation image, and only an intensity image are respectively obtained.

Figure 13:
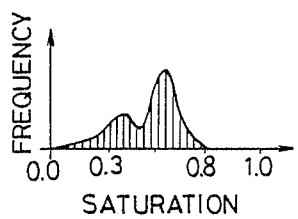
FIG. 13 is a graph showing the relationship between saturation and frequency according to the HSV conversion.

The saturation image may have the histogram shown in FIG. 13 which has two peaks, one for the cancer portion and the other for the normal portion. But the peaks are located closely to each other so that it is very difficult to distinguish one from the other.

Figure 14:
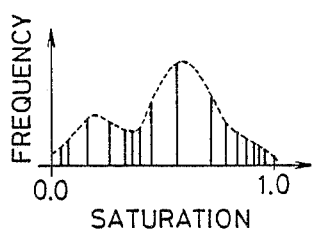
FIGS. 14 and 15 are graphs showing the results of a histogram equalization process carried out for saturation values between 0 and 1, and between 0.3 and 0.8 respectively.
Figure 15:
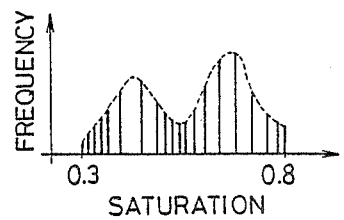

To cope with this, the saturation data are subjected to the histogram equalization process. Namely, the data are converted such that values within a designated range have the same average frequency. Accordingly, the histogram shown in FIG. 13 is changed to the one shown in FIG. 14 after the histogram equalization is carried out for values between 0 and 1, and to the one shown in FIG. 1 after the histogram equalization is carried out for example values between 0.3 and 0.8.

The saturation data subjected to the histogram equalization process and the data of the original hue and intensity images are processed by, for instance, a reverse HSV conversion to reproduce R, G, and B images. Then, a picture in which the vividness of the color of the cancer portion is remarkably different from that of the normal portion is displayed. Namely, a picture in which the cancer portion is easily distinguished from the normal portion can be obtained.

According to this embodiment, the operational sequence are as follows:

(1) observing a picture, (2) displaying the picture of an object (such as a cancer) on a display, (3) pushing a freeze button (not shown), (4) storing the picture as R, G, and B images in R, G, and B memories, (5) inputting histogram process instructions from a console, (6) converting the R, G, and B images into hue, saturation, and intensity images and storing them in the respective memories, (7) carrying out a histogram processing, (8) taking the data of the hue, saturation, and intensity images out of the respective memories, converting them into R, G, and B images, and storing them in the respective memories, and (9) displaying a picture based on the stored R, G, and B images on the color display.

Instead of pushing the freeze button, the original picture and the processed picture may always be displayed together on the display at real time.

According to the embodiment mentioned in the above, a delicate difference in saturation between the cancer portion and the normal portion is enhanced by the histogram equalization process of the saturation image, improving the resolution of the color picture as a whole. Since the difference in color between the cancer portion and the normal portion is enhanced, the image diagnostic capacity of a physician can be improved.

Figure 16:
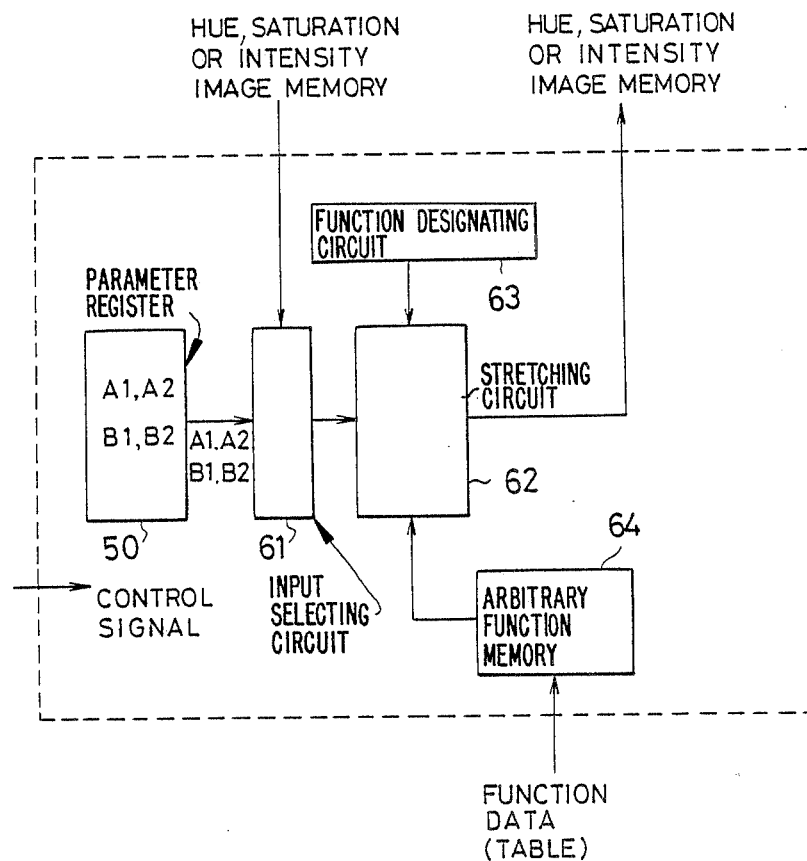
FIG. 16 is a schematic view showing a first embodiment of the stretching process according to the present invention.

FIG. 16 is a view showing an embodiment of the stretching process according to the present invention. This process is carried out in the following sequences:

(1) A function designating circuit 63 decides whether a function is linear or arbitrary.

Figure 17:
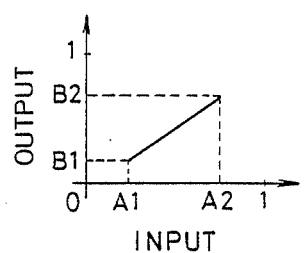
FIGS. 17 and 18 are graphs showing a linear stretching an arbitrary function stretching respectively.

(2) When the stretching is carried out with the linear function, the range of A1 to A2 of an input (saturation, hue, or intensity) is stretched to the range of B1 to B2. Supposing the input is "x" and an output "y", the function designating circuit 63 decides parameters "a" and "b" in the formula of $y = ax + b$ as shown in FIG. 17, and a stretching circuit 62 performs the calculation.

Figure 18:
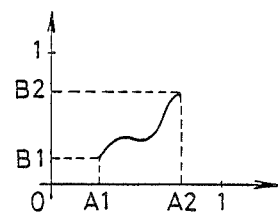

(3) When the stretching is carried out with the arbitrary function, a table in an arbitrary function memory 64 (a function table and data are in advance set from an external equipment, a CPU, a console, a disc, or a memory, which are not shown) follows as shown in, for instance, FIG. 18. When input values range from A1 to A2, the stretching is carried out so as to have output values ranging from B1 to B2.

(4) An input selecting circuit 61 inputs input data into the stretching circuit 62 only when the input data are in the range of A1 to A2.

If the cancer portion is not clear in the saturation image, the preferable results can be obtained by a saturation to hue conversion in the HSV color space. Such a conversion is carried out in the following sequences:

(1) finding a histogram of the saturation image;
(2) finding a median mode or an average value of each of the cancer portion and the normal portion; and
(3) converting the saturation data into the hue data with the above-mentioned parameters.

Figure 19:
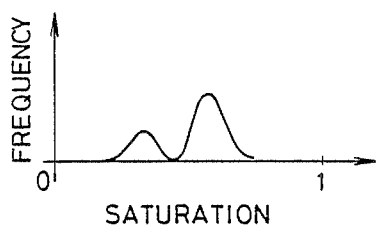
FIGS. 19 to 21 are graphs for explaining a process according to the combination of the saturation histogram equalization and the conversion from saturation to hue.
Figure 20:
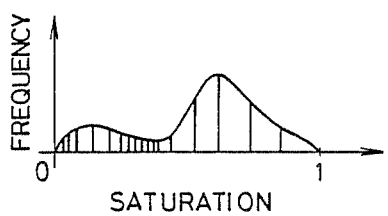
Figure 21:
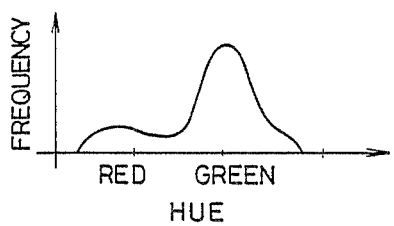

FIG. 19 is a view showing the histogram of an original saturation image, FIG. 20 a view showing a histogram after the histogram equalization process of the saturation image, and FIG. 21 a view showing a histogram after the above-mentioned conversion from the saturation into the hue. As a typical example, in FIGS. 19 to 21, the projected portion on the right side indicates a histogram of the normal portion, and the projected portion on the left side indicates the cancer portion. As is apparent from FIG. 21, the difference between the normal portion and the cancer portion is enhanced by the saturation to hue conversion. The present invention is also applicable to a system in which a television camera for a CCD is connected to an eyepiece portion of a conventional fiber scope.

What is claimed is:

1. An endoscopic system for obtaining a color picture by combining three primary color images with each other, said system comprising:

image converting means for converting said three primary color images into hue, saturation, and intensity images;

means for reproducing said three primary color images from said converted hue, saturation, and intensity images;

histogram processing means for obtaining a histogram based on at least one of said hue, saturation, and intensity images obtained by said image converting means; and then performing at least one of a means for stretching or shifting said histogram, or both.

2. An endoscopic system as claimed in claim 1, wherein said histogram is stretched around a most frequently appearing hue value of an original picture so that the overall color of the picture displayed on a color display is not changed.

3. An endoscopic system as claimed in claim 1, wherein, when the histogram of said intensity image is stretched, said intensity image is not stretched so far as to reach the maximum value thereof.

4. An endoscopic system as claimed in claim 1, wherein the histogram of said saturation image as a whole is shifted on the side of a higher saturation value.

5. An endoscopic system as claimed in claim 1, wherein said image converting means is provided with memories for storing said three primary color images respectively.

6. An endoscopic system as claimed in claim 1, wherein said histogram processing means is provided with memories for storing data from said image converting means.

7. An endoscopic system comprising:
a first device for converting red, green and blue images of a color picture into a hue image, a saturation image, and an intensity image, and reconverting said hue, saturation, and intensity images into red, green and blue images; and
a mechanism for processing a histogram of at least one of said hue and saturation images by a histogram equalization process such that average frequencies at respective values of said at least one of said hue and saturation images are constant.

8. An endoscopic system as claimed in claim 7, wherein said mechanism converts the data of said hue image into values between 0° and 360°.

9. An endoscopic system as claimed in claim 7, wherein, after said histogram equalization process of said saturation image, said processed saturation image is converted into a hue image.

10. An endoscopic system as claimed in claim 7, wherein said histogram equalization process is carried out in a predetermined area of the saturation values between 0 and 1.

* * * * *